Feb. 23, 1943.  E. J. HOLZBOCK  2,312,164
ROTARY SOD BREAKER AND CULTIVATOR
Filed Nov. 29, 1940  3 Sheets-Sheet 1

INVENTOR
Edw. J. Holzbock
BY
ATTORNEYS

Feb. 23, 1943. E. J. HOLZBOCK 2,312,164
ROTARY SOD BREAKER AND CULTIVATOR
Filed Nov. 29, 1940 3 Sheets-Sheet 2

INVENTOR
Edw. J. Holzbock
BY
ATTORNEYS

Feb. 23, 1943. E. J. HOLZBOCK 2,312,164
ROTARY SOD BREAKER AND CULTIVATOR
Filed Nov. 29, 1940 3 Sheets-Sheet 3
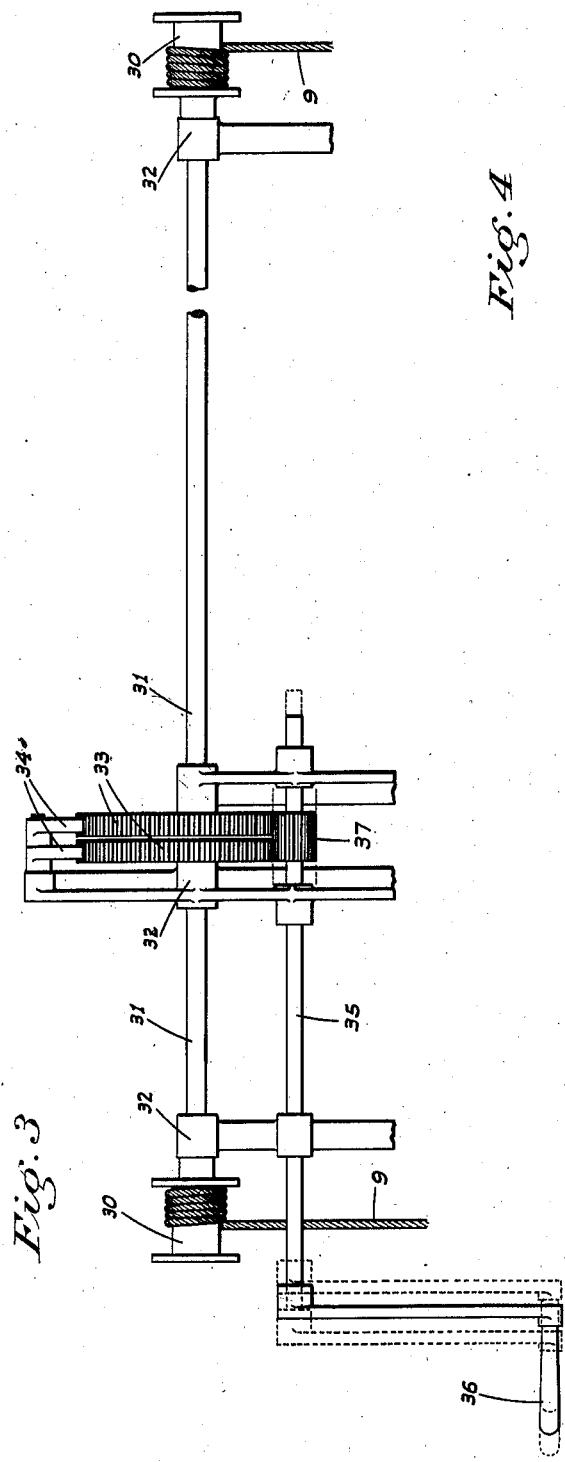
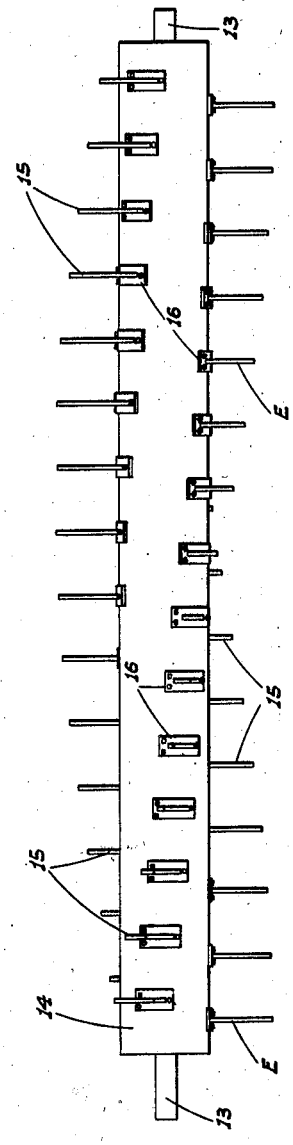
INVENTOR
Edw. J. Holzbock
BY
ATTORNEYS Patented Feb. 23, 1943

2,312,164

UNITED STATES PATENT OFFICE 2,312,164

ROTARY SOD BREAKER AND CULTIVATOR

Edward J. Holzbock, Live Oak, Calif.

Application November 29, 1940, Serial No. 367,756

7 Claims. (Cl. 97—40)

This invention relates to rotary ground working implements, my principal object being to provide an implement of this character initially developed for cutting out Bermuda grass roots, but which is equally adapted for general sod breaking and ground cultivating operations.

A further object is to provide a rotary cutter or ground engaging unit so constructed that it will perform its function efficiently and with a minimum of power, and with little possibility of knife breakage or other trouble in operation.

Another object is to mount the cutter unit so that it may be maintained level in the ground irrespective of any definite and relatively continuous differences in ground surface level on opposite sides of the machine, and so that the unit will operate to any given fixed depth below the ground surface and regardless of any longitudinal tilting of the machine due to irregularities in the ground traversed by the machine.

A further object is to provide a hood structure for the cutter unit so arranged that the dirt as thrown up by the rotation of the cutter unit may be deflected back onto the ground directly behind the implement, or may be allowed to continue in an upward and rearward path so that the dirt may be caught directly in a trailing wagon, if desired.

As stated, the implement has been initially developed for eradicating Bermuda grass, being designed so that the sod will be torn and cut apart in such a manner as to free the roots of soil so that such roots will be left in relatively large pieces. This facilitates the task of gathering or separating the roots from the soil.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a detached fragmentary transverse view showing the level controlling mechanism.

Figure 4 is an elevation of the cutter unit detached.

Figure 1:
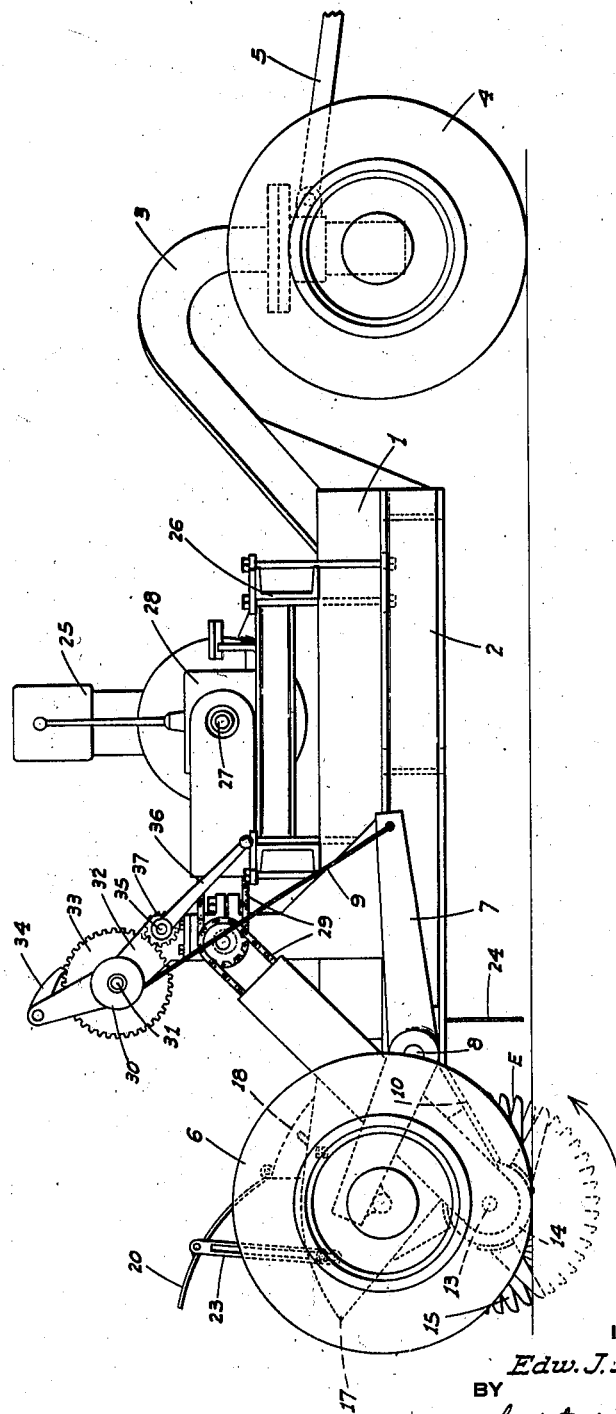
Figure 1 is a side elevation of the machine as in operation.

Referring now more particularly to the characters of reference on the drawings, the machine comprises a rigid frame 1 including longitudinal side beams 2; the frame at its forward end having a central gooseneck 3 which is supported by a swivel wheel truck 4. This truck is provided with a tongue 5 by which draft connection with a tractor may be made.

The frame at its rear end is supported by wheels 6 mounted on the rear end of arms 7. These arms are pivoted intermediate their ends on beams 2 as at 8, and at their forward ends are connected to upstanding cables 9 which are controlled in a special manner as will be hereinafter seen.

Figure 2:
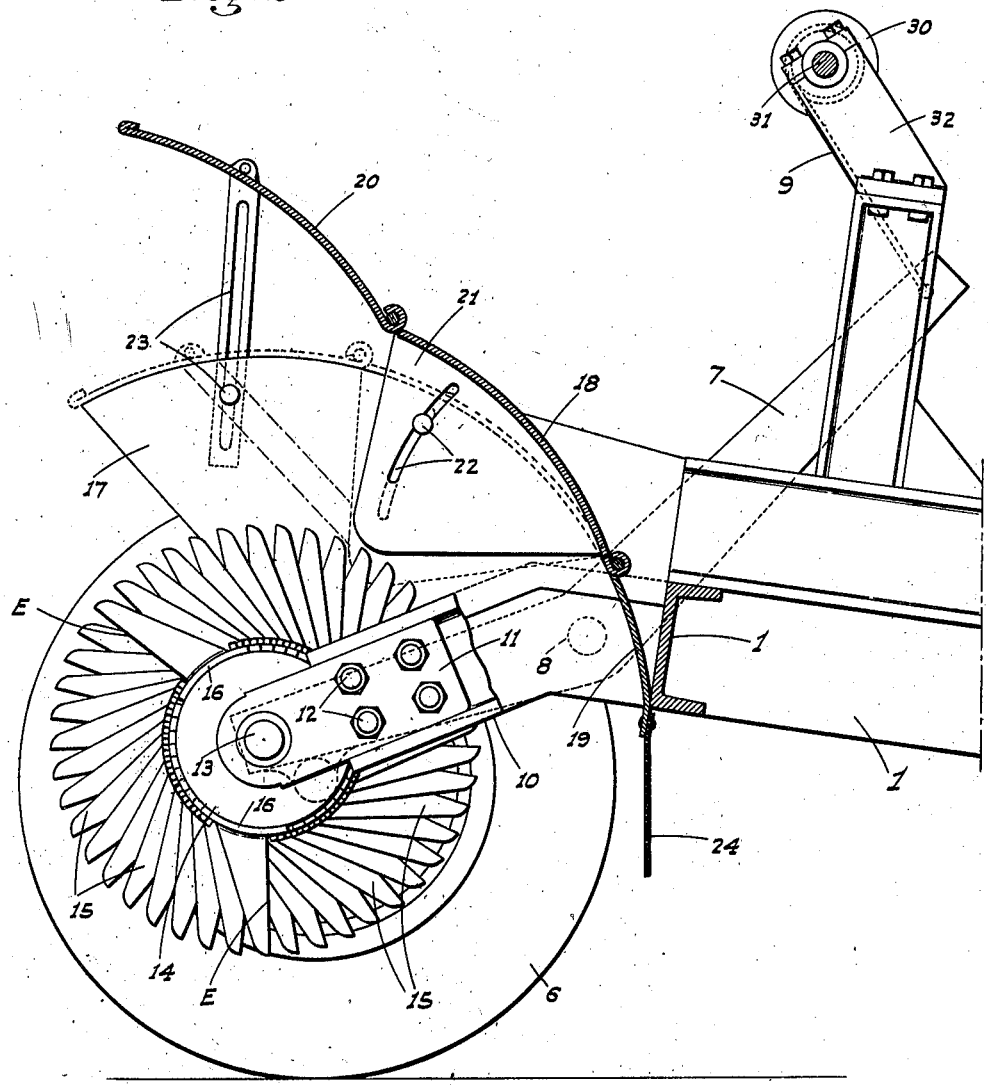
Figure 2 is an enlarged fragmentary longitudinal section showing the cutter unit raised.

Just rearwardly of pivots 8, the beams 10, which are preferably of channel form, bend down somewhat abruptly to form rear-end extensions 10, and bearing boxes 11 are engaged in and project rearwardly from the rear end of these extensions as clearly shown in Fig. 2. The blocks are removably mounted in place by suitable means such as bolts 12.

Turnable in these boxes are the end spindles 13 of a drum 14 from which cutter blades or knives 15 project outwardly; these knives and drum form the cutting or ground working unit. The knives are relatively thin members with their cutting edges E straight and radial; each knife being secured on a pad 16 which follows the contour of and is removably secured against the drum.

As shown in Fig. 4, the knives are arranged in sets, each extending spirally about the drum. I preferably use three sets, and the extent of spiral of each set is substantially one third the circumference of the drum. Also, the knives of the different sets are offset from each other along the drum as shown.

However, it will be understood of course that the number of sets, and their spiral extent may be changed to suit different conditions. In any event, the arrangement is such that the knives offer a minimum of resistance to movement through the ground while effectively cutting through anything in their path, and without any side or drag thrust. The unit may therefore be rotated at high speed with a minimum of power, and should any knife break, it is only necessary to remove the corresponding pad and replace knife and pad as a unit. Should it be desired to remove the entire cutter unit, this may be done by unbolting and sliding the bearing blocks 11 from the rear end of beams 2.

The bearing blocks being well below the level of the beams 2 for the greater portion of the length of the latter, ample ground clearance of the beams is had, even though the drum is practically flush with or even below ground level. I may thus use a small and relatively light drum, while maintaining the beams 2 substantially parallel to and well above ground so that the likelihood of initially upstanding growth in the path of the beams becoming wedged and dragged along thereunder is avoided.

It will be noted that the wheels 6 are mounted on the arms 7 at such a point relative to pivot 8 and the axis of the cutter unit that the cutter axis and wheel axis are vertically alined when the cutter unit is lowered and in operation. In this manner, the unit is supported directly above the bottom of its cut, and an even depth of cut regardless of ground undulation is assured.

A hood to enclose and guide the dirt thrown up by the cutter unit is mounted on the beams 2. This hood includes fixed side wings 17, a forward upwardly and rearwardly curving hood section 18 hinged at its forward end on a fixed lower hood section 19, and a rear curved hood section 20 removably hinged at its forward end on the rear end of section 18. Section 18 is provided with skirts 21 overlapping wings 17, and is held in any desired position by slot and bolt connections 22 between the skirts and wings. Likewise the hood section 20 is independently held in any desired position by slotted link and bolt connections 23 between said section and the wings.

By reason of this arrangement, the hood sections may be set as shown in full lines in Fig. 2 so that the dirt as initially thrown upwardly will be deflected rearwardly but still with an upward slope, or they may be set as indicated in dotted lines in Fig. 2 so as to be substantially concentric with the cutter unit and so that the dirt will be immediately deflected in a downward direction. If a still greater upward throw of the dirt is desired, the rear hood section 20 may be removed.

In order to prevent any appreciable amount of dirt being thrown forwardly below the hood, a flexible transverse flap 24 depends from the fixed hood section 19. The cutter unit is driven from a gas engine 25 set transversely of the frame 1, the engine being mounted on a bed frame 26 separate from and removably strapped on frame 1 substantially centrally between the front and rear wheels.

Power is transmitted to one of the drum spindles 13 from the engine driven shaft 27 back of the transmission 28 by a chain drive arrangement 29 having suitable slack take-up means. The direction of drive is such that the lower blades on the cutter unit turn forwardly. The engine is set on the frame so that its cylinders are substantially vertical when the cutter unit is lowered and the engine is operating. In this manner, uneven engine wear due to tilted cylinders is avoided.

To separately or simultaneously relatively raise and lower the rear wheels from a single control or operating shaft, I provide the following arrangement:

The cables 9 depend from drums 30 mounted on the outer or opposite ends of separate but alined transverse shafts 31. These are disposed back of the engine and are supported from frame 1 by suitable bearing brackets 32. Equal sized gears 33 are fixed on the shafts at their adjacent ends, being held from rotation in a cable unwinding direction by separate dogs 34 engaging teeth of the corresponding gears and mounted on an adjacent bracket 32. In this manner, the teeth of the two gears are always alined.

Slidably and turnably mounted in the brackets for limited sliding movement is a control shaft 35, parallel to shafts 31 and having an operating handle 36 on one end. A pinion 37 is fixed on shaft 36 and is of a length to engage both gears simultaneously as shown in Fig. 3. When so engaged, rotation of the control shaft will wind both cables equally on their drums, relatively lowering the wheels and raising the cutter unit and frame 1, the latter then turning about the front wheels as an axis, as will be evident.

Due to the slidable mounting of the control shaft, however, the pinion may be shifted laterally in one direction or the other to engage and turn only one gear, the other gear and parts connected thereto remaining stationary due to the corresponding pawl 34. This is an advantageous feature in order to enable the cutter unit to be maintained horizontal in the event that one wheel 6 must ride on relatively high or low ground as is the case when the machine is operating adjacent and parallel to a strip of ground already worked on.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rotary ground working implement comprising a rotary cutting unit, and a hood over the upper portion of said unit, said hood including a forward curved hood section, means hinging said section along its forward edge, means to adjust said section about its hinge, a top curved hood section rearwardly of said forward section, means hinging said top section along its forward edge on the rear edge of the forward section, and means to adjust said top section.

2. A structure as in claim 1, in which said top section is detachable from the remainder of the hood.

3. A rotary ground working implement comprising a wheel supported frame which includes longitudinal side beams having top and bottom lateral flanges at their rear end, bearing blocks slidably engaged between the flanges, a rotary cutting unit journaled in said blocks and means removably mounting the blocks on the beams.

4. A rotary ground working implement including a frame, front wheels supporting the frame, a rotary cutting unit mounted on the frame at its rear end, rear wheels supporting the frame, individual adjustment means for the wheels to raise and lower the same relative to the frame, a single control member and means to place said member into operative relationship with either or both of said adjustment means selectively.

5. A rotary ground working implement including a frame, front wheels supporting the frame, a rotary cutting unit mounted on the frame at its rear end, rear wheels supporting the frame, individual adjustment means for the wheels to raise and lower the same relative to the frame, said means including separate alined shafts, gears on said shafts at their adjacent ends, a control shaft parallel to said separate shafts, a pinion on said control shaft of a width to engage both gears and means slidably and turnably mounting said control shaft so that said pinion may be shifted to disengage one or the other of said gears.

6. A structure as in claim 5, with individual pawls each engaging a tooth of a gear to prevent rotation of the gears in one direction.

7. In a rotary ground working implement which includes a frame, front wheels supporting the frame, a rotary cutting unit mounted on the frame at its rear end and wheels disposed laterally out from and adjacent the unit; side arms pivoted intermediate their ends on the frame ahead of the wheels, the latter being mounted on the arms at their rear end and the portions of the arms ahead of their pivots being substantially horizontal, cable drums above said forward portions of the arms, cables connecting the drums and corresponding arm portions, and operating means to selectively rotate either drum or both drums simultaneously.

EDWARD J. HOLZBOCK.